Oct. 8, 1968     T. FOHL     3,404,655

DEPTH CONTROLLER

Filed June 8, 1967

INVENTOR
TIMOTHY FOHL
BY Ernest P. Cohen

United States Patent Office
3,404,655
Patented Oct. 8, 1968

3,404,655
DEPTH CONTROLLER
Timothy Fohl, 36 Esterbrook Road,
Acton, Mass. 01720
Filed June 8, 1967, Ser. No. 645,574
10 Claims. (Cl. 114—235)

ABSTRACT OF THE DISCLOSURE

A device for controlling and maintaining the depth of submerged, towed objects which consists of a rotatable cylinder maintained in a horizontal position and powered by an internal, controllable-speed motor.

---

This invention resulted from work done under Contract 14-17-0007-365 with the Bureau of Commercial Fisheries of the Department of the Interior. In accordance with the requirements of the President's Patent Policy Statement of Oct. 10, 1963, 28 F.R. 10943, the domestic title to the invention is in the Government.

Background of the invention

When a device is towed submerged through water, its depth is determined by the interplay of a variety of forces. These forces include the weight of the towed object, its drag, the length of tow line, the dynamic forces imposed on the tow line and the speed at which the object is being towed. In many applications it is highly desirable or necessary that the towed object maintain a selected depth or be readily adjustable to any required depth.

Consequently, in such applications, there must be provided controllable means which can provide a sufficient vertical force on the submerged object to overcome the effect of all other forces operating on the towed device. One typical application is in the towing of oceanographic sensing, monitoring and sampling devices.

Another important application of depth control devices is in the field of commercial fishing. The development of echo sounding equipment and other devices for locating schools of fish has generated a continuing interest in fishing the midwater region, here defined to be that ocean region between the surface and the bottom. It is relatively simple to net fish either at the surface or along the bottom of the water. However, netting located schools of fish in the region between the surface and the bottom is much more difficult since means must be supplied to adjust and control the depth of the net.

Typical equipment used in fishing the midwater region consists of a net which is towed by cables known as warps, behind a boat. The net is spread horizontally by doors attached to the warps. Each wing of the net is attached to a door by several cables known as legs, and the net trails behind the doors. The depth of the net is influenced by the drag of the net, the length of the warps, the weight of the net assembly including the doors and the tow rate.

After a school of fish has been located by echo sounding from the towing vessel, the depth of the net must be adjusted to the depth of the school. Depth adjustment can be done in a variety of ways including slowing the tow rate or lengthening the warps to lower the net and reversing these steps to raise it.

Much more positive, accurate and responsive control of net depth can be achieved by providing an independent depth control system on the net assembly. One such control system comprises a door or otter board arrangement having controllable diving planes. Such a system is shown in Patent No. 2,729,910 by R. A. Fryklund, issued Jan. 10, 1956, and entitled, "Controllable Depth Maintaining Devices."

The present invention comprises a depth control device utilizing a novel rotor wing construction so as to provide highly responsive control and a large lift capability. Hence, it is an object of this invention to provide an improved depth controller device.

It is a further object of this invention to provide a device for controlling the depth of objects advancing submerged through a body of water.

It is another object of this invention to provide a device for spreading the mouth of a fishing net and for controlling its depth in the water.

Description of the invention

The invention will be more clearly understood from the following description of a preferred embodiment wherein reference is made to the accompanying drawings.

Figure 1:
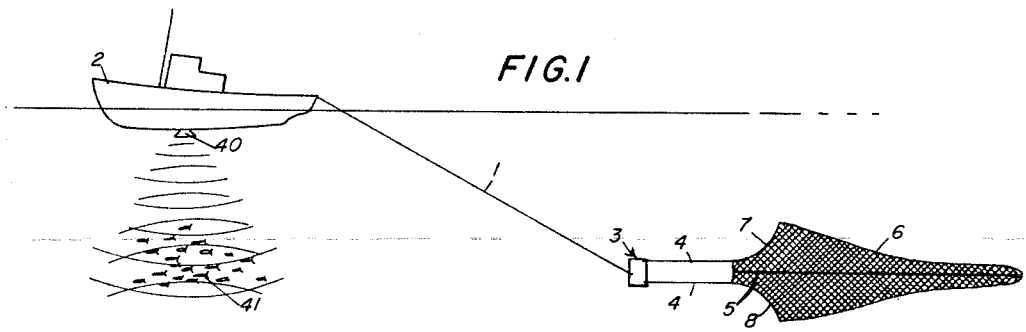
FIGURE 1 illustrates an elevation view through the water showing the surface vessel, the depth controlling device and the net attached thereto.
Figure 2:
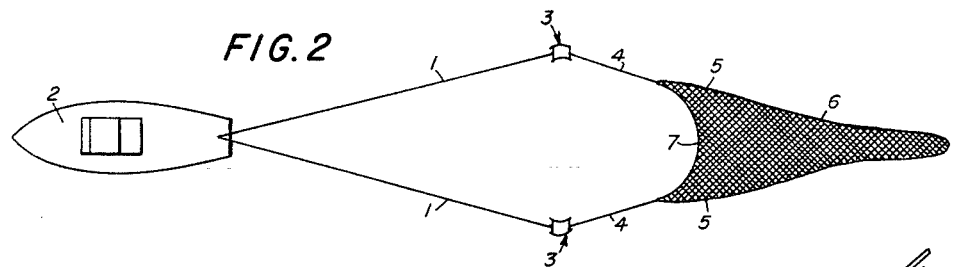
FIGURE 2 illustrates a top plan view of the structure shown in FIG. 1.
Figures 3, 4:
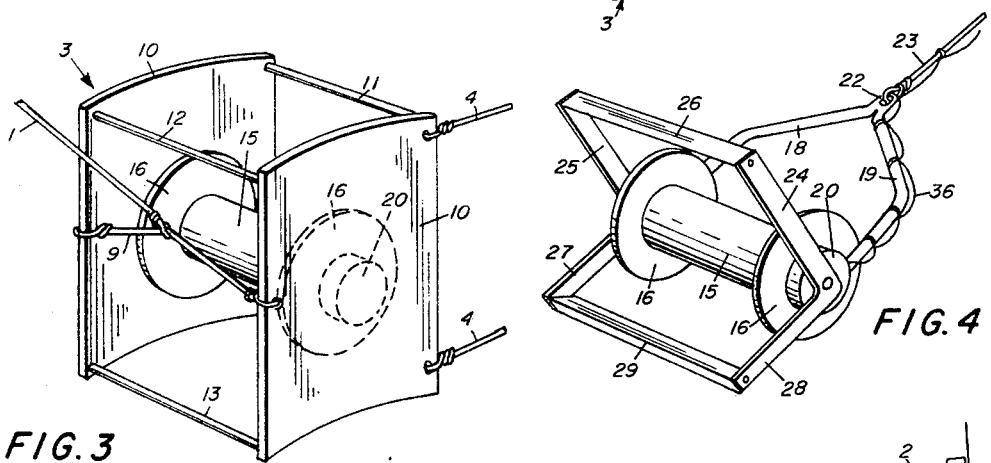
FIGURE 3 illustrates the rotor wing depth control device adapted for use in spreading and controlling the depth of a fishing net.
FIGURE 4 illustrates the rotor wing depth control device adapted for use in towing an object, such as an oceanographic instrument, submerged through the water.

As shown in FIGURES 1 and 2, two towlines or warps 1 extend from a boat 2 and are attached respectively to a pair of rotor wing depth controllers 3 of the type shown in FIGURE 3. Cables or legs 4 connect the depth controller to the wings 5 of the net 6. The vertical opening of the net is maintained by floats on the head rope 7 and weights on the foot rope 8. An echo sounder 40 is mounted on the boat and is used to locate schools of fish 41.

FIGURE 3 shows the construction of the rotor wing depth controller on an enlarged scale. The depth controller is attached to the warp 1 by a bridle 9 which is secured to a pair of vertical wings 10 which are of an appropriate hydrofoil shape and are so sized as to provide a sufficiently large horizontal force to adaquately spread the wings of the net at the lowest usable fishing speed. Horizontal lift provided by the wings may be varied by adjusting the angle of attack of the wings so as to accommodate different fishing gear. This may be done by changing the position at which the warp attaches to the bridle or by any other conventional method.

Wings 10 are positioned relative to each other by structural members 11, 12 and 13. The inner one of the pair of vertical wings is connected to the legs 4. Legs 4 then connect to the wing of the net (not shown).

Figure 6:
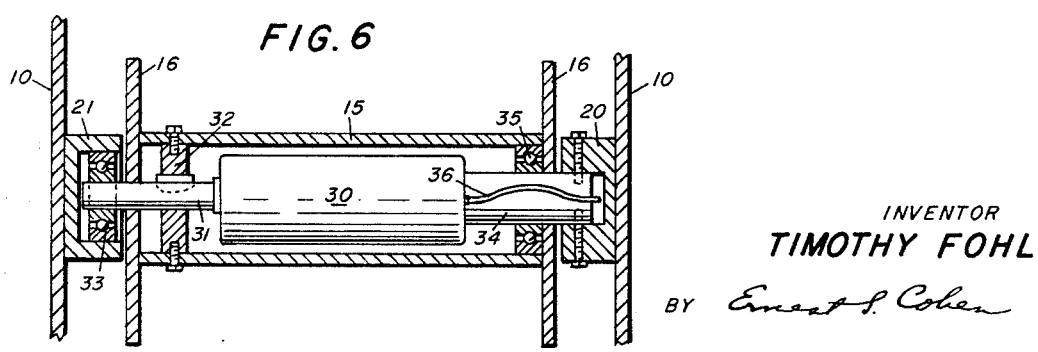
FIGURE 6 is a sectional view of the rotor assembly.

Supported between the two vertical wings is a rotor 15 having end plates 16. While the rotor end plates 16 are not necessary to the functioning of the device, this provision increases the efficiency of the system by minimizing flow disturbances. Rotor 15 is driven by a motor 30, located inside the rotor, details of which are shown in FIGURE 6.

Rotation of rotor 15 about its axis provides the vertical lift necessary to control the depth of the net. Vertical lift arises due to the Magnus effect. This effect is described in a number of text books as for example, Prandtl's Essential of Fluid Dynamics, pages 68–70 and 142–144, published by Hafner Publishing Co., New York, 1952.

The lift per unit of frontal area of the rotor is a function of its rate of rotation and its velocity through the water. When the rotor is driven so that its lower surface is moving opposite to the direction of tow, or away from the boat, the resultant lift is downward. Reversing the direction of rotation reverses the direction or lift. Magnitude of the lift is controlled by adjusting the rotor speed.

Aside from its ease of control, the other principal advantage of the rotor wing is that it can achieve a higher lift coefficient than any other known hydrofoil configuration. The lift coefficient is an experimentally determined factor which is a function of the geometry of the hydrofoil and its angle of attack with respect to the flow. It is defined by the equation $C=L/Sq$ where C is the coefficient of lift, L is the lift force exerted, S is some convenient area of the hydrofoil body and $q$ is the dynamic pressure exerted by the fluid on the body as it moves past. The maximum lift coefficient which can be attained in water with a simple vane is about 1.4. The lift coefficient of a rotor wing is smoothly variable from 0 to about 13 depending upon its rate of rotation.

It is preferred that the rotor be of cylindrical shape since this configuration provides the highest efficiency. However, rotors of an ellipsoid shape or even a truncated sphere display the same effect to some degree and are within the scope of this invention.

Figure 5:
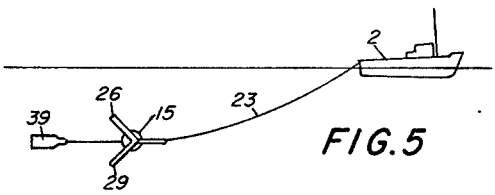
FIGURE 5 is a diagrammatic view showing the controlled object under tow by a boat.

FIGURE 4 illustrates the rotor wing depth controller adapted for towing objects, such as oceanographic instruments, through the water. In this version of the device, the vertical wings are replaced by a stabilizer system designed to keep the axis of the cylindrical rotor in a horizontal plane. The bridle 17 consists of legs 18 and 19 which are attached to flanges 20 and 21 (flange 21 shown in FIGURE 5) at the end of the rotor. The bridle is connected at its forward end through link 22 to tow cable 23 for advancement through the water.

Arms 24 and 25 are pivotally mounted at the outside of flanges 20 and 21 respectively. These arms extend upwardly and support between their free ends float 26. Arms 27 and 28 similarly support weight 29 in a plane below the float 26. Weight 29 and float 26 are preferably symmetrically streamlined so as not to produce lift forces other than by their buoyancies.

In operation (see FIGURE 5) the depth controller is towed behind a boat 2 by a tow cable 23 and in turn tows object 39 the depth of which is to be controlled. Float 26 and weight 29 maintain the stability of the depth controller. Depth of the towed object 39 is adjusted and maintained by controlling the direction and speed of the rotor 15.

FIGURE 6 is a sectional view of the rotor mechanism. It is adapted for use in the spreading and controlling of the depth of a fishing net by mounting vertical wings on flanges 20 and 21 in the manner shown in FIGURE 3. Likewise it is adapted for use in towing oceanographic instruments by attaching a bridle and stabilizer assembly to the flanges as shown in FIGURE 4.

Rotor 15 with circular end plates 16 surrounds the motor 30. The rotor is fixed at one end to the motor drive shaft 31 by means of a drive web 32. The free end of the motor drive shaft is mounted in bearing 33 which is supported in flange 21. The motor 30 is supported by hollow sleeve 34 which is fixed in flange 20. Bearing 35 allows the rotor to turn freely about hollow sleeve 34.

Control and power cable 36 runs from motor 30 through sleeve 34 and flange 20. From the flange, the cable is led to a power source most conveniently by running the cable along or as an integral part of the line towing the depth controller device.

The motor can comprise any type which is susceptible to accurate speed control. A motor powered by compressed air combines flexible speed control and compactness and is satisfactory to power the rotor. However, particularly when using two of the rotor wing depth controllers to control a fishing net, it is preferred to use synchronous electric motors driven by a single variable frequency power supply. Such a system insures that the rotors on both depth controllers maintain identical speeds thus preventing imbalanced forces on the fishing net.

The following system illustrates an adaptation of the invention for use in midwater trawling. As shown in FIGURES 1 and 2, two rotor wing depth controllers 3 are used to spread the wings of a trawl net. Typical gear would include a two-seam trawl net in which the head rope 7 and the foot rope 8 are each about 60 feet long. The height of the head rope is usually maintained about 15 to 20 feet above the foot rope by attaching floats to the head rope and weights to the foot rope.

Upon locating a school of fish 41 and determining its depth by means of echo sounder 40 located on the boat, the depth of the net is adjusted to correspond with the depth of the school. Depth of the net is continuously monitored by means of an echo sounder mounted on the head rope of the net as is currently done. Diving rate and equilibrium depth of the fishing gear are controlled by adjusting the rotation rate of the rotor wings.

The rotor wing depth controllers must supply a sufficient downward force so as to position the net at the depth of the school before reaching the school. Under the most severe conditions, this requires that the net must move from the surface to a depth of about 600 feet while traveling forward less than the warp length, or about 1500 feet.

At a tow speed of about four knots, each rotor wing must produce a total downward force of approximately 3500 pounds in order to achieve such performance.

Rotor wings capable of producing such lift forces weigh on the order of 1500 pounds each. The additional hydrodynamic lift force which each rotor must produce then is about 2000 pounds. At the maximum lift coefficient of about 13 and at a speed of four knots, each rotor must have a frontal area of about three square feet. Convenient dimensions of the rotor cylinder is about three feet long and one foot in diameter. Rotational speed required to achieve maximum lift at four knots is about 1000–1500 r.p.m. Power requirements for each rotor is on the order of 3 to 4 horsepower.

What is claimed is:

1. A device for controlling the depth of an object moving submerged through a body of water comprising a symmetrical member rotatable about an axis of symmetry, said member being of circular cross section in all planes perpendicular to said axis, means for maintaining the axis of symmetry and rotation of said member in a horizontal attitude, means to reversibly rotate said member about its axis of symmetry and towing means operably connected to a motive source to tow said device through the water.

2. The device of claim 1 wherein said rotatable manner is supported between two hydrofoils positioned in a plane perpendicular to said axis of rotation, said hydrofoils being so shaped as to provide a horizontal component of force to the device when said device is moving through water.

3. The device of claim 2 wherein said rotatable member is cylindrical and is drivable at different speeds.

4. The device of claim 3 wherein a circular end plate is fixed to each end of said cylindrical rotatable member.

5. The device of claim 3 wherein said cylindrical rotatable member is driven by means of a synchronous electric motor powered by a variable frequency source.

6. The device of claim 5 wherein said synchronous electric motor is mounted inside said cylindrical rotatable member.

7. The device of claim 1 wherein said means for maintaining the axis of symmetry and rotation of said rotatable member in a horizontal attitude comprises a framework operably supporting said rotatable member, said framework having an upper and a lower set of arms, said upper set of arms supporting a float member and said lower set of arms supporting a weight member.

8. The device of claim 7 wherein said rotatable member is a cylinder having circular plates fixed at each end thereof.

9. The device of claim 8 wherein said rotatable member is drivable at different speeds.

10. The device of claim 9 wherein said cylindrical rotatable member is driven by a motor mounted within said rotatable member.

References Cited

UNITED STATES PATENTS

| 1,674,169 | 6/1928 | Flettner | 115—3 X |
| 1,820,919 | 9/1931 | Massey. | |

FOREIGN PATENTS

| 25,414 | 5/1963 | Germany. |
| 29,760 | 8/1964 | Germany. |

MILTON BUCHLER, *Primary Examiner.*

TRYGVE M. BLIX, *Assistant Examiner.*